(12) United States Patent
Pich

(10) Patent No.: US 9,233,766 B2
(45) Date of Patent: Jan. 12, 2016

(54) INSTALLATION FOR EMPTYING BAGS OF PULVERULENT PRODUCT AND METHOD EMPLOYING THE INSTALLATION

(71) Applicant: Emmanuel Pich, La Talaudiere (FR)

(72) Inventor: Emmanuel Pich, La Talaudiere (FR)

(73) Assignee: S.P.C.M. SA (FR)

( * ) Notice: Subject to any disclaimer, the term of this patent is extended or adjusted under 35 U.S.C. 154(b) by 66 days.

(21) Appl. No.: 14/041,997

(22) Filed: Sep. 30, 2013

(65) Prior Publication Data
US 2014/0090747 A1    Apr. 3, 2014

(30) Foreign Application Priority Data

Oct. 1, 2012    (FR) ...................................... 12 59292

(51) Int. Cl.
| | |
|---|---|
| B65B 1/28 | (2006.01) |
| B01D 47/06 | (2006.01) |
| B08B 15/02 | (2006.01) |
| B65B 69/00 | (2006.01) |
| B65G 69/18 | (2006.01) |
| C02F 1/54 | (2006.01) |

(52) U.S. Cl.
CPC . *B65B 1/28* (2013.01); *B01D 47/06* (2013.01); *B08B 15/023* (2013.01); *B65B 69/0075* (2013.01); *B01D 2247/12* (2013.01); *B65G 69/182* (2013.01); *C02F 1/54* (2013.01)

(58) Field of Classification Search
CPC ........ B08B 5/04; B65B 69/008; B65D 88/32; B65G 65/34; B65G 69/18
USPC ................. 55/385.1, 385.2; 454/187; 134/62, 134/104.2, 200; 312/1; 414/412
See application file for complete search history.

(56) References Cited

U.S. PATENT DOCUMENTS

| | | | |
|---|---|---|---|
| 1,968,532 A | | 7/1934 | Liptay |
| 3,707,998 A | * | 1/1973 | Dalrymple ...................... 141/93 |
| 3,739,471 A | * | 6/1973 | Peres ............................... 30/433 |
| 4,034,877 A | * | 7/1977 | Bennison ...................... 414/412 |
| 4,252,489 A | * | 2/1981 | Mechalas ...................... 414/412 |

(Continued)

FOREIGN PATENT DOCUMENTS

| | | |
|---|---|---|
| DE | 8805028 U1 | 6/1988 |
| DE | 102008011161 B3 | 6/2009 |

(Continued)

OTHER PUBLICATIONS

French Search Report Application No. FR 1259292 Dated: Jun. 18, 2013 3 pages.

(Continued)

*Primary Examiner* — Duane Smith
*Assistant Examiner* — Minh-Chau Pham
(74) *Attorney, Agent, or Firm* — St. Onge Steward Johnston & Reens, LLC

(57) ABSTRACT

An apparatus for emptying bags of pulverulent products without the spread of dust on the outside, which is intended to be used in particular in a water treatment plant, the apparatus including a box equipped with a removable closure, a slab situated at the periphery of the box, the slab being able to receive the bags so that they can be opened inside the box, a dust suction situated at the top of the box, a mechanism for dispersing the sucked-up dust or dissolving it in scrubbing water, a hopper situated at the base of the box, able to collect the powder from the bags, a mechanism of transporting the powder from the hopper to a powder storage.

11 Claims, 3 Drawing Sheets

(56) References Cited

U.S. PATENT DOCUMENTS

| | | | |
|---|---|---|---|
| 4,289,438 A * | 9/1981 | Murer | 414/412 |
| 4,440,185 A * | 4/1984 | Wiltse | 134/104.4 |
| 4,627,781 A * | 12/1986 | Borgner | 414/412 |
| 4,668,253 A * | 5/1987 | Lonardi et al. | 96/405 |
| 4,798,508 A * | 1/1989 | Lewis | 414/412 |
| 4,928,440 A * | 5/1990 | Hughes | 451/88 |
| 4,993,199 A * | 2/1991 | Hughes | 451/88 |
| 5,062,871 A * | 11/1991 | Lemon, III | 55/385.2 |
| 5,095,925 A * | 3/1992 | Elledge et al. | 134/61 |
| 5,097,750 A * | 3/1992 | Oldham et al. | 454/63 |
| 5,222,511 A * | 6/1993 | Mikkelsen et al. | 134/62 |
| 6,581,778 B1 * | 6/2003 | Kato et al. | 209/21 |
| 6,656,242 B1 * | 12/2003 | Golightly et al. | 55/315 |
| 2004/0020364 A1 * | 2/2004 | Koclejda et al. | 95/273 |
| 2012/0304860 A1 * | 12/2012 | Matson | 95/273 |

FOREIGN PATENT DOCUMENTS

| | | |
|---|---|---|
| EP | 0337469 A2 | 10/1989 |
| FR | 2964891 A1 | 3/2012 |
| GB | 2240263 A | 7/1991 |
| WO | 03086912 A1 | 10/2003 |
| WO | 2009146535 A1 | 12/2009 |

OTHER PUBLICATIONS

INRS: "Traitement des Gaz Dangereux Captés Sur Les Lieux de Travail—ED4262"; Nov. 30, 2006; 4 pages.

* cited by examiner

INSTALLATION FOR EMPTYING BAGS OF PULVERULENT PRODUCT AND METHOD EMPLOYING THE INSTALLATION

FIELD OF THE INVENTION

The invention relates to an installation for emptying bags of pulverulent material without causing dust to be discharged to outside. Another subject of the invention is a method employing the installation, the method being more particularly applied to acrylamide-based polymers.

BACKGROUND OF THE INVENTION

Certain pulverulent chemical products which come in bags give off dust when the bag is being emptied. This dust is likely to be inhaled and certainly inconveniences the operators. To limit this risk, the operators have therefore to wear breathing masks and anti-dust attire.

This problem is encountered both for water-soluble products and for water-insoluble products.

Chemical products of this type are, for example, the polyacrylamides used as flocculants in water treatment. These polymers may be:
   anionic and used in the treatment of drinking water and of mineral substances (quarries, truck washes, mines, etc),
   cationic and used in the treatment of urban sludge for example, with dust which is an irritant.

When the quantities are large, the pulverulent products are transported in trucks or in big bags, which has led to the development of special installations.

However, for smaller quantities, such means are unsuitable. As far as the applicant is aware, there does not currently exist any suitable installation apart from a few low-quality devices. Aside from the abovementioned problem associated with the inhalation of dust by the operator, it is found that a non-insignificant amount of the dust may be deposited on the ground, and become hydrated, making the surrounding surfaces slippery and dangerous.

In spite of everything, certain solutions have been proposed. One of these involves ventilating the zone in which the bag is emptied and then filtering the dusty air. However, and particularly in the case of hygroscopic or plugging products, the filter sleeves very soon become plugged, making the system ineffective.

It is therefore necessary to develop a system for emptying bags of pulverulent material which is suitable, for example, for small purification stations. It needs in particular to be effective and economical, and require the minimum of maintenance

SUMMARY OF THE INVENTION

The applicant company has developed an apparatus which solves this problem set.

Thus one subject of the invention is an apparatus for emptying bags of pulverulent products without the spread of dust on the outside, which is intended to be used in particular in a water treatment plant, said apparatus comprising:
   a box equipped with a removable closure means,
   a slab situated at the periphery of the box, said slab being able to receive the bags so that they can be opened inside the box,
   a dust suction means situated at the top of the box,
   a means for dispersing the sucked-up dust or dissolving it in scrubbing water,
   a hopper situated at the base of the box, able to collect the powder from the bags,
   a means of transporting the powder from the hopper to a powder storage means.

According to a first feature, the removable closure means advantageously takes the form of a strip curtain.

According to another feature, the dust suction means advantageously takes the form of a centrifugal fan.

According to another feature, the means for dispersing the sucked-up dust or dissolving it takes the form of a gas scrubber tube with sprayed water, or a gas scrubbing column with packing(s).

In the case of a scrubbing tube with sprayed water, the tube takes the form of a vertical tube equipped at its top with at least two water sprayers.

In practice, the means for sucking up the dust is connected to the tube or column via a ventilation pipe.

Moreover and according to another feature, the means for transporting the powder from the hopper to powder storage means takes the form of a flexible screw or of a pneumatic transport means.

Likewise and in practice, the powder storage means which may potentially form part of the apparatus takes the form of a storage hopper.

Another subject of the invention is a method employing the apparatus described hereinabove, particularly in a water treatment plant. This may be a plant for treating drinking water, water containing mineral substances (quarries, truck washes, mines, etc), for the treatment of urban sludge, or a purification station.

According to this method:
   the removable closure means is opened,
   the bag is positioned on the slab,
   the bag is opened and then emptied into the box,
   at the same time the suction means is used to suck up the dust,
   the sucked-up dust is dispersed or dissolved in scrubbing water using the dispersion or dissolving means,
   the powder from the bags is collected in the hopper situated at the base of the box,
   the powder is transported using the transport means from the hopper to a powder storage means.

According to the method, the pulverulent product is water-soluble or water-insoluble.

In one particular embodiment, it is an acrylamide-based polymer.

In practice, the dust-laden scrubbing water is removed to the remainder of the water treatment plant, particularly to the purification station.

The invention and the ensuing advantages will become better apparent from the following embodiment examples supported by the attached figures.

DETAILED DESCRIPTION OF THE INVENTION

Figure 1:
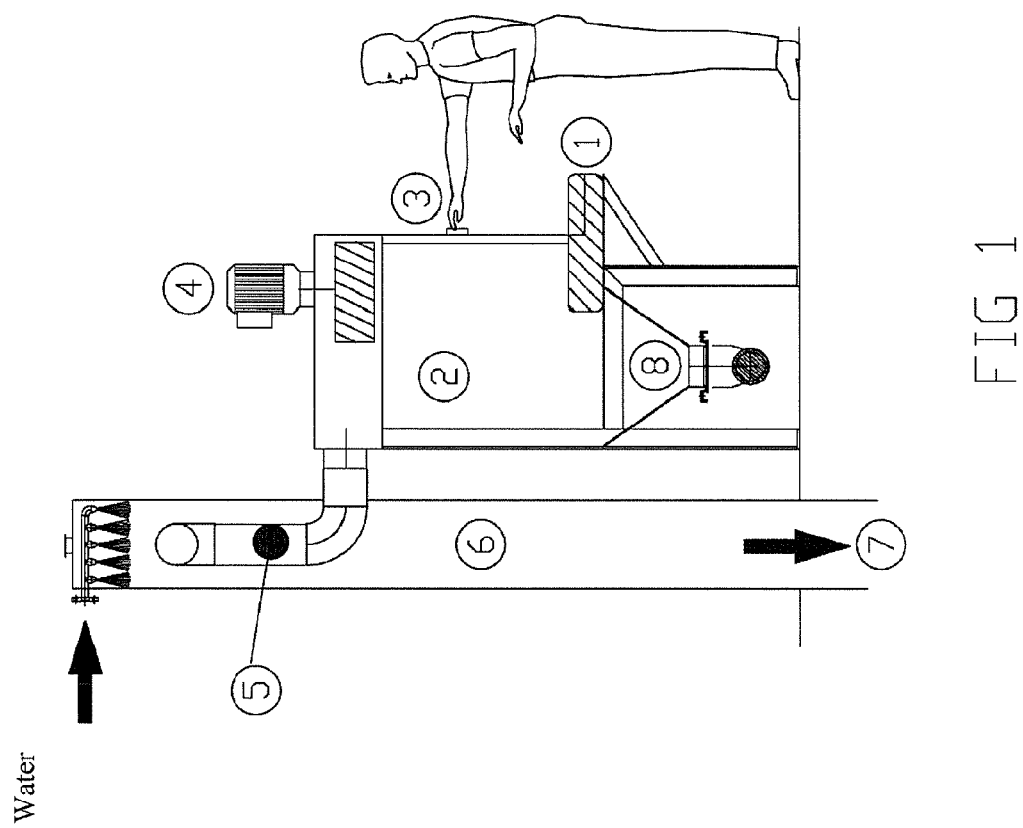
FIG. 1 is a schematic depiction of the apparatus of the invention.

The apparatus of the invention is more particularly depicted in FIG. 1.

It comprises:

A bag rest slab on which the bag (not depicted) is placed to be cut open (1) and emptied.

A box of parallelepipedal type (2), closed on its front face by means of flexible plastic strips (3).

A centrifugal fan (4) positioned at the top of the box (2) and generating enough flow rate to carry away any dust placed in suspension at the time that the bag is opened then emptied. The fan flow rate is, for example, 1000 m³/h. This fan will preferably be made of plastic or Teflon-coated steel in order to avoid adhesion.

This fan is equipped with a ventilation pipe (5) in which the air speed will be of the order of 25 m/sec in order to avoid deposition.

A gas scrubbing tube (6) equipped with water spray nozzles at the top for knocking down the dust transported by the fan. Alternatively, it is also possible to use a gas scrubber with packing(s).

The scrubbing water thus laden with small quantities of polymer is returned to one of the hydraulic equipments (7), for example of a purification station.

Figure 2:
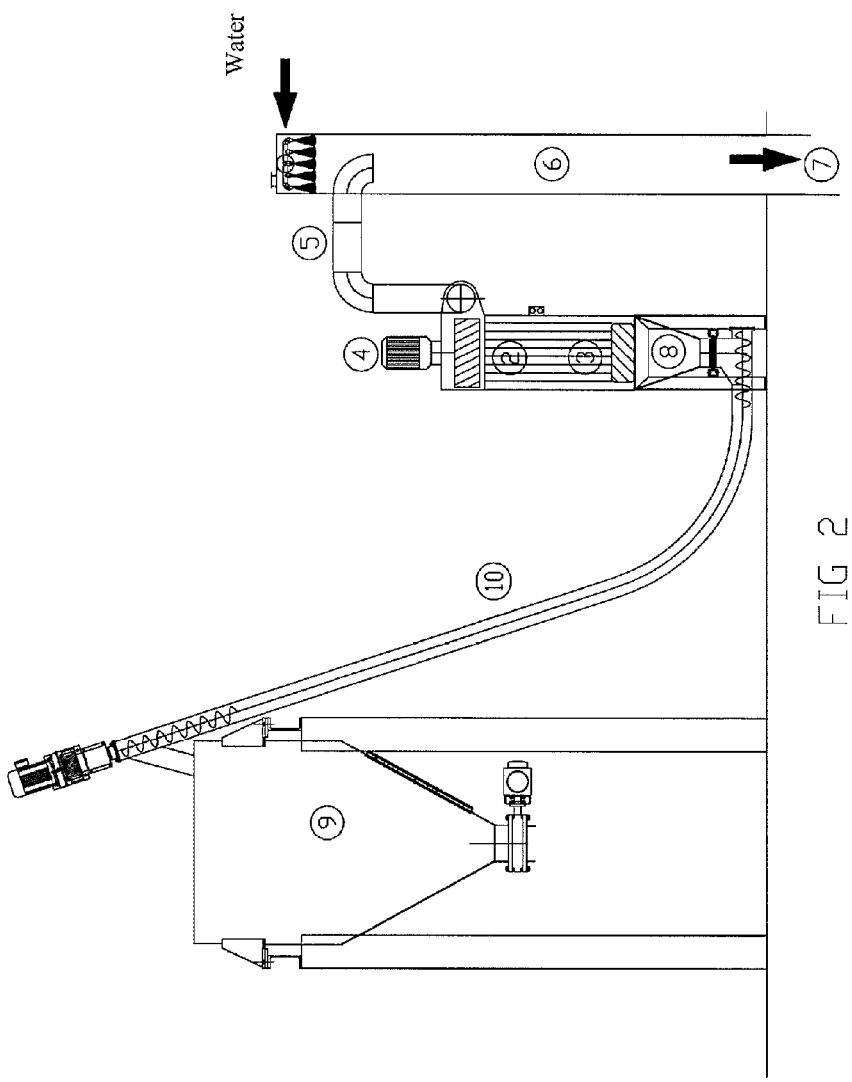
FIG. 2 is a schematic depiction of a partial water treatment plant in a first embodiment and, more particularly, of the emptying of the product used and its transportation using a flexible screw.

As depicted in FIG. 2, the polymer leaving the bag is collected in a hopper (8) located under the parallelepipedal box (2) and is conveyed to the storage hopper (9) using a flexible screw (10).

Figure 3:
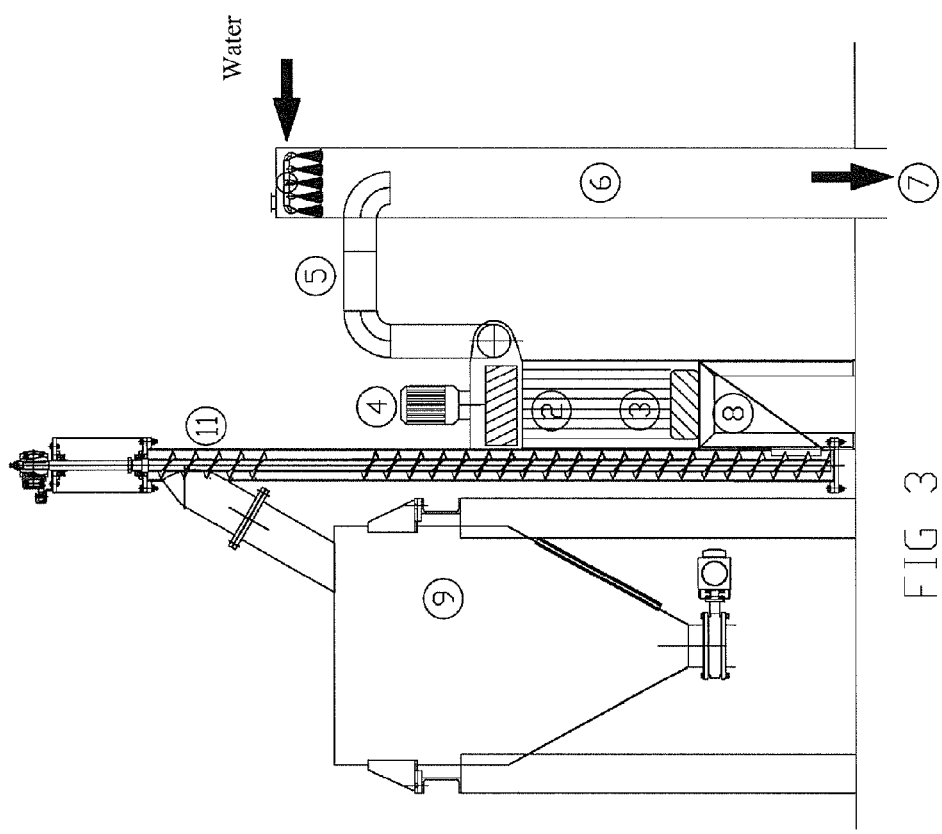
FIG. 3 is a schematic depiction of a partial water treatment plant according to a second embodiment.

As depicted in FIG. 3, the powder is conveyed by means of a vertical screw (10) mounted on an asymmetric hopper.

Tests have shown that this apparatus is able to eliminate the dust generated at the time of emptying bags of polyacrylamides in particular, and to do so without plugging.

Quite obviously, this hardware can be applied to other pulverulent products that need to be dissolved in water, such as guar gums, xanthate gums, native or cationic starch.

In terms of the scrubbing water used to knock down the dust, this may be discharged into the nearby aqueous environment or used for dissolving the treatment product, in this instance the polymer.

By extension, this apparatus can be used for emptying bags of pulverulent product without the risk of plugging.

By extension, the fan may be replaced by an ejector which will allow the parallelepipedal box to be ventilated at a sufficiently high flow rate.

What is claimed is:

1. An apparatus for emptying bags of pulverulent products without the spread of dust on the outside, said apparatus comprising:
    a box equipped with a removable closure,
    a slab situated at a periphery of the box, said slab being able to receive the bags so that the bags can be opened inside the box,
    a sucker, which sucks dust, situated at a top of the box,
    a disperser that disperses the sucked-up dust or dissolves the sucked-up dust in scrubbing water,
    a hopper situated at a base of the box, able to collect the powder from the bags,
    a transporter that transports the powder from the hopper to a powder storage.

2. The apparatus as claimed in claim 1, wherein the removable closure takes the form of a strip curtain.

3. The apparatus as claimed in claim 1, wherein the sucker takes the form of a centrifugal fan.

4. The apparatus as claimed in claim 1, wherein the disperser takes the form of a gas scrubber tube.

5. The apparatus as claimed in claim 1, wherein the disperser takes the form of a gas scrubbing column with packing(s).

6. The apparatus as claimed in claim 1, wherein the sucker is connected to the disperser via a ventilation pipe.

7. The apparatus as claimed in claim 1, wherein the transporter comprises a flexible screw or a pneumatic transporter.

8. A method implementing the apparatus of claim 1 comprising the steps of:
    opening the removable closure,
    positioning the bag on the slab,
    opening the bag and then emptying the bag into the box,
    at the same time sucking up the dust with the sucker,
    dispersing or dissolving the sucked-up dust in scrubbing water using the disperser,
    collecting the powder from the bags in the hopper situated at the base of the box,
    transporting the powder using the transporter from the hopper to the powder storage.

9. The method as claimed in claim 8, wherein the pulverulent product is water-soluble or water-insoluble.

10. The method as claimed in claim 8, wherein the pulverulent product is an acrylamide-based polymer.

11. The method as claimed in claim 8, wherein the dust-laden scrubbing water is removed to a water treatment plant.

\* \* \* \* \*